United States Patent

[11] 3,620,576

| [72] | Inventors | Heinz Wehde<br>Heidelberg;<br>Kurt Schindler, Nussloch; Joachim Rogge, Monchzell; Armin Czinczel, Heidelberg, all of Germany |
|---|---|---|
| [21] | Appl. No. | 845,418 |
| [22] | Filed | July 28, 1969 |
| [45] | Patented | Nov. 16, 1971 |
| [73] | Assignee | Teldix GmbH<br>Heidelberg, Germany |
| [32] | Priority | July 27, 1968 |
| [33] | | Germany |
| [31] | | P 17 80 062.3 |

[54] ELECTRONIC CONTROL OF VEHICLE BRAKE SYSTEM
12 Claims, 9 Drawing Figs.

[52] U.S. Cl. .................................... 303/21 BE,
188/181 C, 303/20
[51] Int. Cl. ......................................... B60t 8/08,
B60t 8/12
[50] Field of Search........................................ 188/181 A,
181 C; 303/20 T, 21 A, 21 B, 21 BB, 21 BE, 21 C,
21 G, 21 F; 307/120, 121; 324/161, 162; 340/262,
263

[56] References Cited
UNITED STATES PATENTS

| 3,235,036 | 2/1966 | Meyer et al | 188/181 C |
| 3,467,444 | 9/1969 | Leiber | 188/181 A |
| 3,482,887 | 12/1969 | Sheppard | 303/21 B |
| 3,494,671 | 2/1970 | Slavin et al | 303/21 A X |
| 3,498,683 | 3/1970 | Leiber | 188/181 A |

Primary Examiner—Milton Buchler
Assistant Examiner—Stephen G. Kunin
Attorney—Spencer & Kaye ABSTRACT: A plurality of filters are fed by a voltage which is proportional to the rotational speed of a wheel being braked. At least one filter produces an output which follows this voltage substantially without phase displacement whereas at least one other filter substantially differentiates this voltage and produces an output which is shifted 90° in phase and is proportional to rotational deceleration and acceleration of the wheel. Threshold circuits are fed by the filter outputs and control a normally open brake fluid inlet valve and a normally closed outlet valve.

INVENTORS
Heinz Wehde
Kurt Schindler
Joachim Rogge &
Armin Czinczel

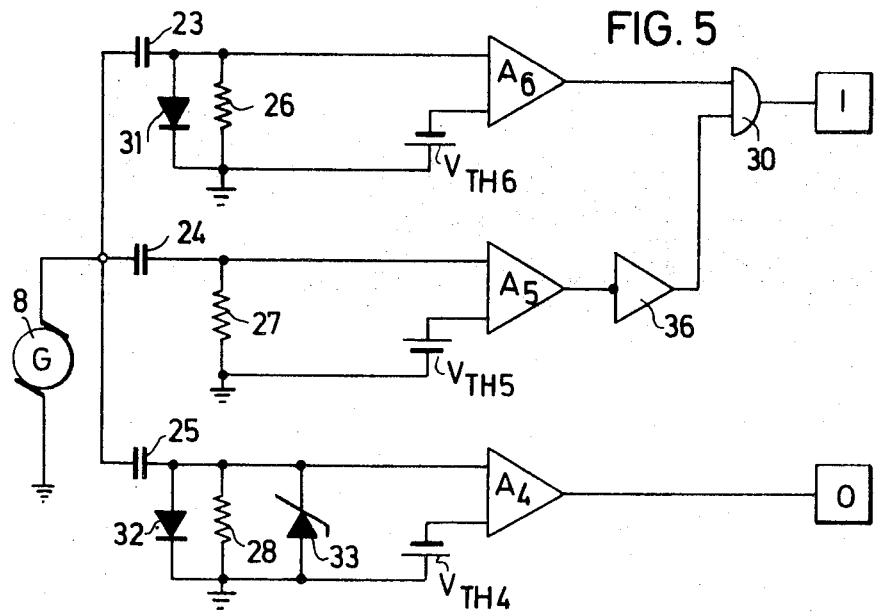
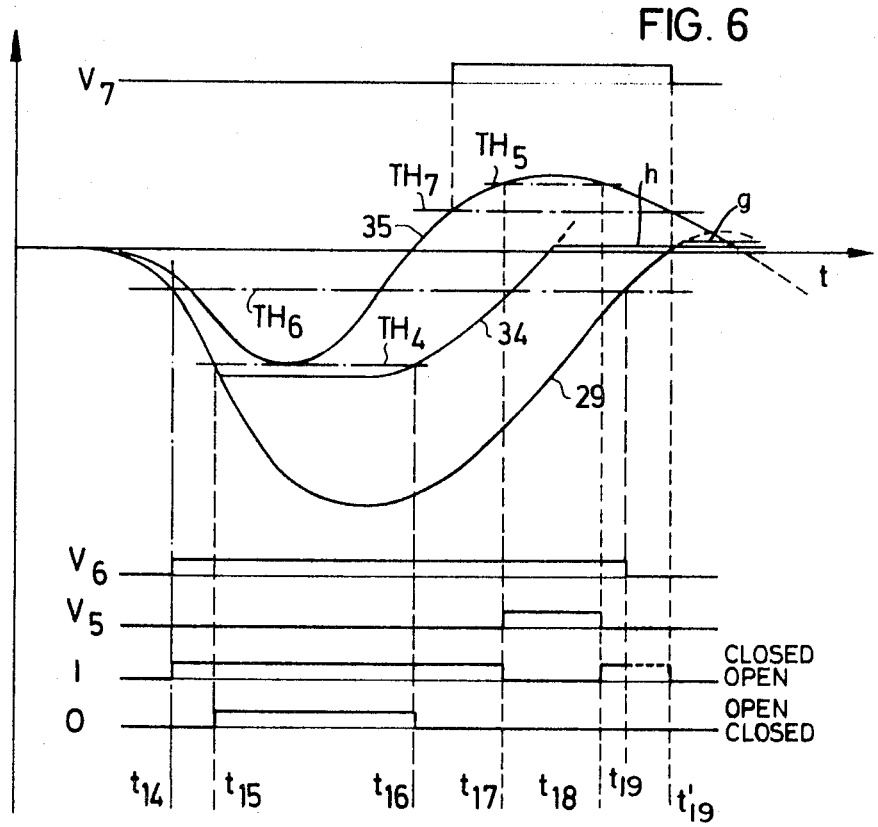

ELECTRONIC CONTROL OF VEHICLE BRAKE SYSTEM

BACKGROUND OF THE INVENTION

Copending U.S. application Ser. No. 771,079, filed by Heinz Leiber on Oct. 28, 1968, now Pat. No. 3,556,610, issued Jan. 19, 1971 discloses an antilocking control system for vehicle brakes in which the normally open inlet valve and the normally closed outlet valve in the brake fluid pressure line are controlled during brake application and wherein such control is effected through the use of mechanical contacts actuated by an inertial mass, the system employing a tachometer voltage generator, electrical filters and electrical circuit members. In general, this system is such that the normally open inlet valve is closed when the braked wheel begins to decelerate, while at a certain rotational deceleration value the outlet valve is opened while the inlet valve remains closed thereby to reduce the working pressure of the brake fluid. The outlet valve is closed again when a certain rotational acceleration of the wheel occurs and at some subsequent time the inlet valve is reopened to once again increase the working pressure of the brake fluid.

Copending U.S. application Ser. No. 686,492, filed by Heinz Leiber on Nov. 29, 1967, now U.S. Pat. No 3,498,683, issued March 3, 1970 discloses an antilocking control system of the above general type but wherein the inlet valve is temporarily opened in the closing phase of the cycle at particularly high rotational accelerations of the wheel.

Aside from the use of mechanical contacts which are prone to failure the above-mentioned systems are limited as to flexibility in the control of the valve mechanisms. For example, to produce the control signal for the outlet valve which lowers the pressure, a speed-proportional voltage may be applied to a high-pass filter consisting of a resistor and a capacitor wherein a voltage appears across the resistor only in response to variations in the rotational speed of the wheel. This voltage is then compared with a predetermined comparison voltage and the desired control signal is produced when the comparison voltage is exceeded in one direction or the other.

SUMMARY OF THE INVENTION

The present invention is directed to an improved type of control system as described generally hereinabove in which the electromagnetically actuatable valves which influence the effective brake pressure are controlled through the medium of a device producing an output signal proportional to the rotational speed of the associated wheel being braked. This output signal is fed to a plurality of filters which produce respective outputs that are phase-shifted with respect to each other and these different signals are fed to threshold value circuits for controlling the inlet and outlet valve means. Such a system readily permits a high degree of flexibility in the manner in which the inlet and outlet valve means may be controlled and, to this end, the output from one filter circuit may have a form which follows the speed-responsive voltage input thereto substantially without phase displacement, whereas another filter is so constructed as to differentiate the speed-responsive voltage to produce a signal which is substantially proportional to the rotational deceleration and acceleration of the vehicle wheel.

The system according to the present invention is highly reliable since it is not subject to mechanical wear and the speed-responsive signal may be produced by a generator or a suitable pulse generator whose output is smoothed to provide a continuous value which is at least approximately proportional to the rotational speed of the vehicle wheel.

Accordingly, an object of the present invention is to derive control signals for the magnetically operated valves of an antilocking control system for vehicle brakes from a speed-responsive signal, which control signals are more adaptable and flexible than those of previously known systems and will produce the best possible braking action for all combinations of frictional values between the wheel and the roadway and for all possible variations in these frictional characteristics.

A further object of the present invention is to provide an improved form of control system as described generally hereinabove wherein filter circuits, threshold circuits and associated logic circuits, if necessary, are combined in such a manner as to produce greater adaptability and flexibility for the inlet and outlet valve means of the braking system.

A further object of the present invention is to provide an arrangement in accord with the preceding object wherein the filters are in the form of RC series circuits and wherein diodes are combined with the resistors of these circuits in such a manner as to achieve better flexibility, reliability and control of the braking system.

A further object of the present invention is to provide an improved control system as described employing RC series filters in combination with diodes so as to assure that the magnetically operated inlet and outlet valves return to their normal positions at the end of each control cycle.

According to one embodiment of the present invention, two filters are utilized for control of the outlet valve means, one filter producing an output approximating the difference between the peripheral speed of the wheel and the speed of the vehicle whereas the other filter differentiates this speed difference and thus approximately reproduces the rotational deceleration or acceleration of the wheel. The filters are coupled together by means of a diode so that only the higher filter output voltage is effective at their common output and, in combination therewith, a threshold value amplifier is provided having a hysteresis threshold value and having a feedback connection so that it exhibits a negative switch-on threshold and a positive switch-off threshold. The beginning of the control signal acting on the outlet valve is therefore at that point where the differential speed between the vehicle and the periphery of the wheel exceeds a certain threshold value whereas the end of the control signal occurs when the rotational acceleration of the wheel exceeds a certain threshold value.

A further embodiment of the invention utilizes a further diode or chain of diodes poled oppositely to the first diode and having a higher breakdown voltage, with the threshold value lying near the blocking voltage of the further diode. This arrangement provides an increase in the filter output voltage as long as the differential speed increases, i.e., during deceleration of the wheel, and produces a decreasing voltage as the wheel accelerates. As a result, the outlet valve closes soon after the wheel has begun to accelerate after its initial deceleration, this closing of the outlet valve being responsive to the rotational speed of the wheel.

The inlet valve means of the system may be controlled by a filter and threshold value circuit such that the inlet valve is closed as long as the differential in speed between the periphery of the wheel and the vehicle lies above a certain threshold. Reopening the inlet valve at the end of a control cycle may be made dependent not only upon the differential speed but also upon the rotational acceleration of the wheel in the sense that the two mentioned parameters must both have fallen below their associated thresholds before the valve opens. This may be accomplished according to the present invention by providing a differentiating filter having a positive threshold value whose output signal is applied to an OR gate for the inlet valve, a further input to the OR gate being from a filter representing the speed differential between the periphery of the wheel and the vehicle. The output voltage of the differentiating filter maybe limited toward the negative side by means of a diode in order to prevent closing of the inlet valve in response to momentary rotational deceleration which may be caused by unevenness in the roadway or the like.

A further embodiment of the present invention for controlling the inlet valve means may utilize but a single threshold value circuit. In this case, a differential filter is provided which is limited toward the negative side and a further filter is provided which reproduces the approximate speed differential and which is limited toward the positive side with the threshold circuit producing an output signal so long as the difference between the outputs of the two filters lies above a predetermined threshold value.

In addition, provision may be made for temporarily opening the inlet valve during the closing phase of each cycle by providing an additional differentiating filter having a threshold value circuit provided with a positive threshold which is set relatively high and whose output signal disables all other inlet valve control signals.

BRIEF DESCRIPTION OF THE DRAWINGS

FIG. 5 is a circuit diagram illustrating a further modification of the invention.

FIG. 6 is a composite diagram illustrating certain operational characteristics of the systems of FIGS. 5 and 7.

DETAILED DESCRIPTION OF THE INVENTION

Figure 1:
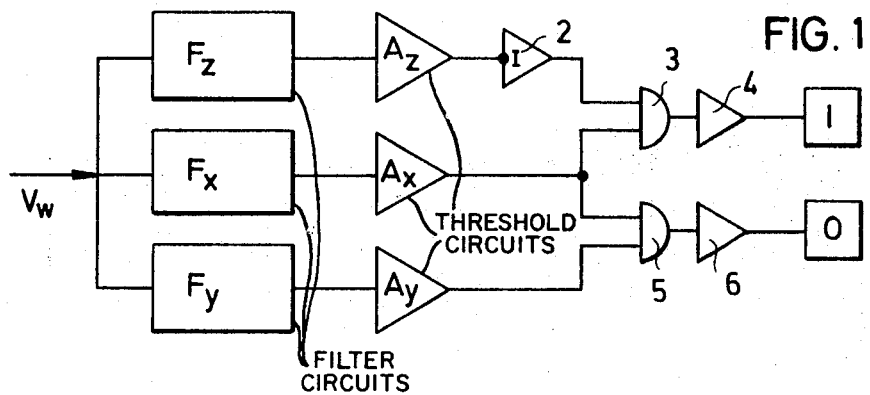
FIG. 1 is a block circuit diagram of one embodiment of the present invention.

The system shown diagrammatically in FIG. 1 illustrates certain basic principles according to the present invention. As shown, the system includes the three filter circuits $F_x$, $F_y$ and $F_z$ which are connected in parallel to a source of voltage $V_w$ proportional to the rotational speed of the associated vehicle wheel and which produce different output signals in response to variations in the voltage signal $V_w$ for logic control of the respective inlet and outlet valves I and O.

The inlet valve I is normally open and serves to permit the brake fluid pressure generated in the vehicle master cylinder to be transmitted to the brake slave cylinder of an associated vehicle wheel. The outlet valve O, on the other hand, is normally closed but is adapted to be opened after the inlet valve is closed to bleed fluid from the slave cylinder correspondingly to reduce the brake fluid pressure acting on the slave cylinder.

Figure 2:
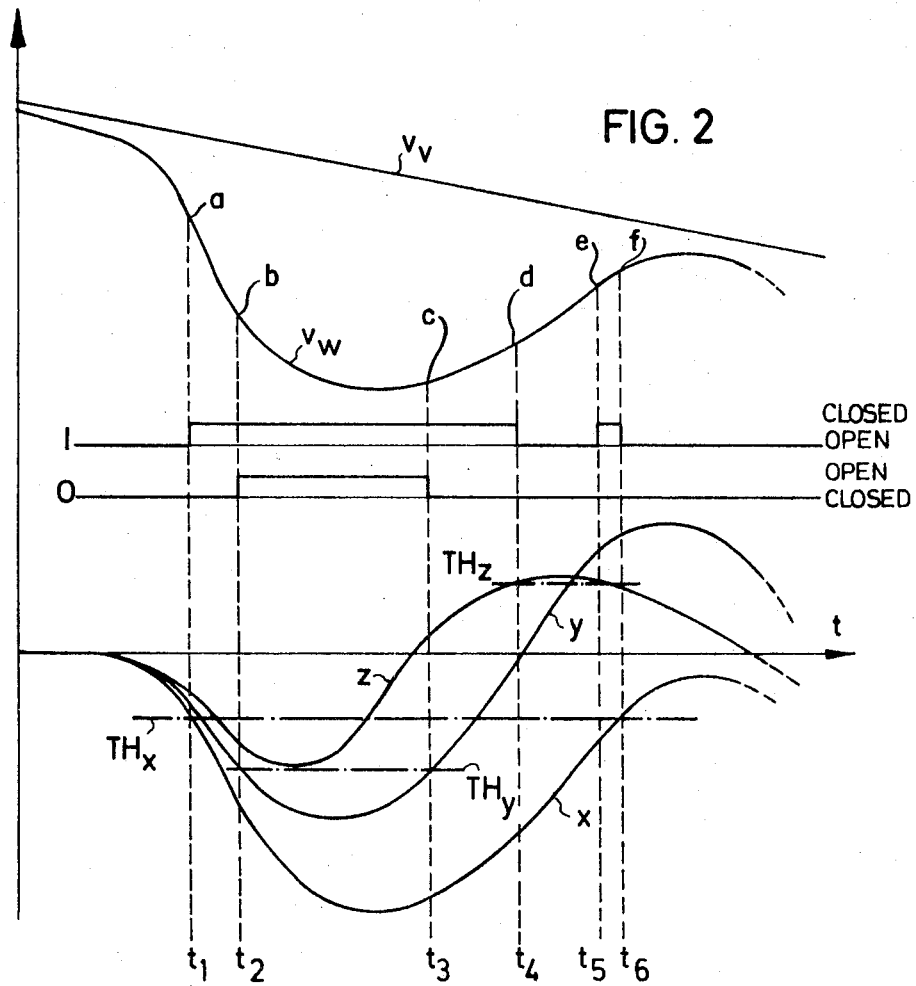
FIG. 2 is a composite diagram illustrating the mode of operation of the embodiment of FIG. 1.

The inception of an antilocking brake cycle as described above may be appreciated more readily from a study of FIG. 2. In the upper portion of this figure, the curves $v_r$ and $v_w$, respectively represent the vehicle speed and the rotational speed of the vehicle wheel. At the onset of brake application, the rotational speed of the vehicle wheel decreases rapidly until, at point $a$, the inlet valve I is closed thereby to retain a constant brake fluid pressure acting upon the wheel brake slave cylinder. The rotational speed of the wheel continues to decrease until, at point $b$, the outlet valve O is opened to reduce the brake fluid working pressure. Some time thereafter, the wheel will begin to accelerate until, at point $c$, the outlet valve O is closed to establish a reduced, constant brake fluid working pressure. The wheel continues to accelerate until, at point $d$, the inlet valve I is returned to its normally open state to increase the brake fluid working pressure. As a result, the wheel will continue to accelerate but at a reduced rate and, between points $e$ and $f$, the inlet valve may be closed momentarily again.

One of the system is to prevent a simultaneous open condition of both the inlet and outlet valves and this function, together with the requisite control of the two valves as shown, is accomplished by means of the different output signals from the filter circuits $F_x$, $F_y$ and $F_z$ in conjunction with the threshold circuits $A_x$, $A_y$ and $A_z$, the associated AND-gates 3 and 5 and the inverter 2.

Because of their different filter characteristics, the filters $F_x$, $F_y$ and $F_z$ produce the different output signals $x$, $y$ and $z$ in response to variations in the voltage signal $V_w$ which is proportional to the rotational speed $v_w$ of the vehicle wheel. The threshold circuits $A_x$ and $A_y$ are responsive to respective negative thresholds $TH_x$ and $TH_y$ so that at time $t_1$, corresponding to point $a$, the gate 3 is operated by the inverted output of the circuit $A_z$ and the output of circuit $A_x$ to actuate the amplifier 4 and close the inlet valve I. At time $t_2$, the gate 5 is opened by the outputs of circuits $A_x$ and $A_y$ to energize the amplifier 6 to open the outlet valve O. When the output from the circuit $A_y$ disappears at time $t_3$, the amplifier 6 is deenergized and the outlet valve returns to its normally closed state.

The inlet valve, in the meantime, remains closed until the positive threshold $TH_z$ is reached thereby to produce a zero output from the inverter 2 to deenergize the amplifier 4 and allow the inlet valve to return to its normally open state. When the signal $z$ falls below the threshold $TH_z$, the inlet valve is again actuated to its closed condition and shortly thereafter the signal $x$ increases above the threshold $TH_x$ and the inlet valve again returns to its normally open state.

The cycle may be repeated one or more times dependent upon the braking effort applied to the vehicle master cylinder, the cycle illustrating, for example, a period of the order of one-fifth second. In any event, it will be appreciated that the rotational speed $v_w$ of the wheel is controlled with respect to the vehicle speed $v_r$ as is disclosed in greater detail in the above-cited copending application Ser. No. 771,079, filed Oct. 28, 1968, now U.S. Pat. No. 3,556,610.

It will be seen from FIG. 2 that the time constant of the circuit $F_x$ is relatively long so that the voltage output $x$ follows changes in the voltage $V_w$, and consequently changes in the rotational speed $v_2$, practically without phase displacement. The circuit $F_Y$ is of somewhat shorter time constant so that some phase displacement is manifested in signal $Y$ with respect to the voltage signal $x$. The circuit $F_z$ is of somewhat time constant and has a phase displacement of substantially 90°. Thus, the curve $z$ is representative of wheel deceleration and acceleration.

Figure 3:
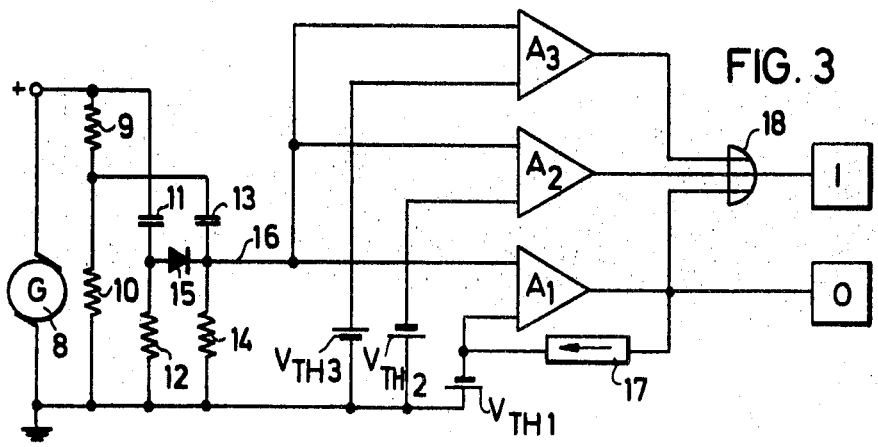
FIG. 3 is a circuit diagram illustrating a modified control system according to the invention.

The system according to FIGS. 1 and 2 however, may lead to situations in which the threshold $TH_z$ may not be reached, in which case the inlet valve may remain closed and, during the next cycle when the negative threshold $TH_Y$ is reached, the resultant opening of the outlet valve will lower the brake fluid pressure too much since the pressure was not restored by opening of the inlet valve during the first cycle. FIG. 3 illustrates one embodiment of a circuit for overcoming this problem.

In FIG. 3, the voltage generator 8 is driven by the associated vehicle wheel to produce the output voltage $V_w$ previously mentioned. One filter circuit is taken directly across the terminals of the generator 8 and consists of the series RC circuit 12, 11. A second filter circuit consists of the RC circuit 14, 13 connected across the terminals of the generator 8 through the medium of the voltage divider resistor chain 9, 10. The outputs of the two filters 13, 14 and 11, 12 are shown respectively as the two curves 20 and 21 in FIG. 4, from which it will be apparent that the voltage divider chain 9, 10 is chosen to provide equal maximum negative excursions for these two curves. The time constant of the filter 13, 14 is chosen so that the voltage output curve 20 follows the voltage output of the generator 8 substantially without phase displacement whereas the time constant of filter 11, 12 is chosen to provide differentiation, or substantially 90° phase displacement.

Figure 4:
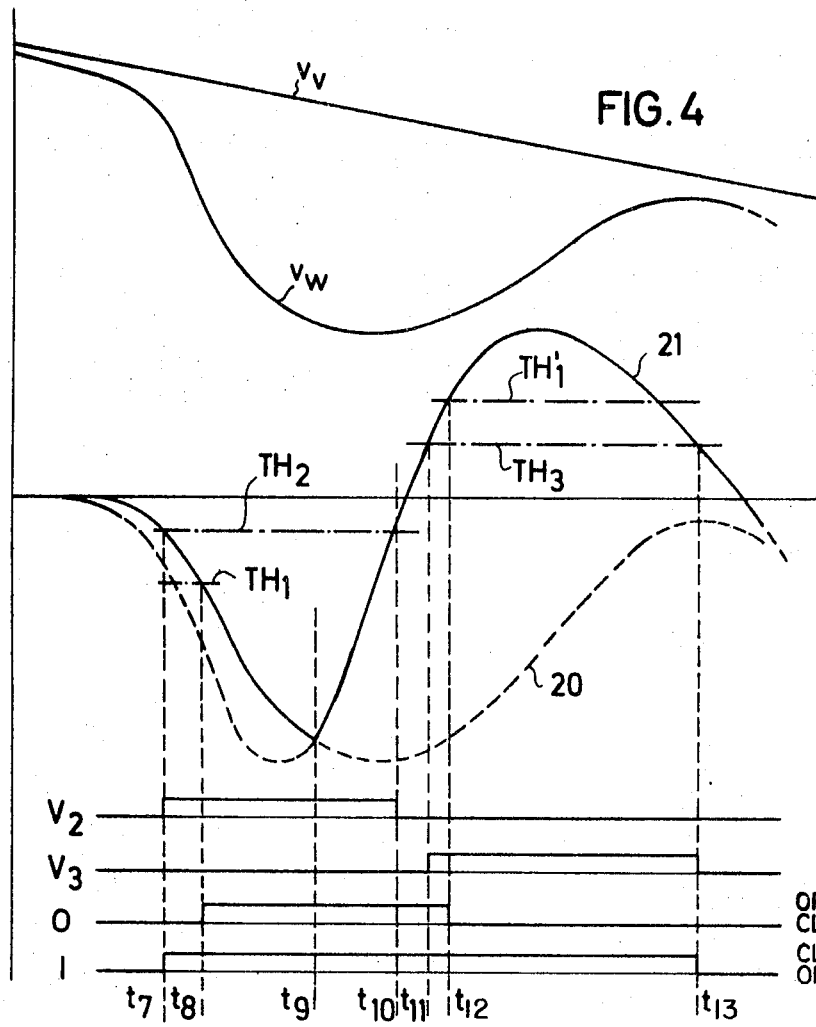
FIG. 4 is a composite diagram associated with FIG. 3.

The diode 15 connects the outputs of the two filters such that the output at 16 is the output of whichever curve 20 or 21 is more positive and this is illustrated in FIG. 4 by the solid line portions of these curves.

The output at 16 is applied in parallel to the three differential amplifiers $A_1$, $A_2$ and $A_3$ which are provided with respective threshold voltage reference sources $V_{TH1}$, $V_{TH2}$ and $V_{TH3}$. The two former voltage references are negative with the first being of greater negative value while the last is of positive value, as represented by the thresholds $TH_1$, $Th_2$ and $TH_3$ in FIG. 4. The outputs of all three differential amplifiers are applied to an OR-gate 18 controlling the inlet valve I while the output of the amplifier $A_1$ is also applied directly to control the outlet valve 0. The amplifier $A_1$ is also provided with a feedback loop 17 which causes the circuit to have a hysteresis characteristic such that after the output at 16 has exceeded in a negative direction the negative value of the threshold $TH_1$, at time $t_8$ in FIG. 4, the output of the amplifier $A_1$ will not subsequently disappear until the input signal has exceeded a second, positive threshold $TH_1'$, this being due to the fact that a portion of the signal at the output of amplifier $A_1$ is fed back to alter the amplifier threshold value.

Since the threshold $TH_2$ is less negative than the threshold $TH_1$, the inlet valve closes at time $t_7$ while the outlet valve opens at time $t_8$. The second, positive threshold for the amplifier $A_1$ is indicated by $TH_1'$ and the outlet valve thus closes only when this positive threshold is reached at time $t_{12}$. Since the inlet valve remains closed as long as any of the three amplifiers is producing an output, it will open only at time $t_{13}$ when the deceleration-acceleration voltage output curve 21 falls below the threshold $TH_3$. In FIG. 3, and as is shown in FIG. 4, the arrangement for producing that portion of the cycle corresponding to the latter part of the cycle of FIG. 2, beyond time $t_4$, has been omitted for the sake of simplicity. In FIG. 4, $V_2$ and $V_3$ represent the output signals from amplifiers $A_2$ and $A_3$, respectively, while O represents both the state of valve O and the output of amplifier $A_1$.

It will be seen from FIG. 4 that if the values of the thresholds $TH_3$ and $TH_1'$ are chosen low enough, there is little danger that the inlet valve will not be closed during a cycle.

The embodiment of FIG. 5 illustrates further flexibility according to the invention. In this form, the two filters 23, 26 and 25, 28 are substantially identical so that they tend to produce outputs, according to curve 29 in FIG. 6, which follow changes in the output of the generator 8 practically without phase displacement. However, the output of the filter 25, 28 is modified by the use of a zener diode 33 so that the negative excursion of this filter is limited as indicated by the curve 34, the threshold $TH_4$ produced by threshold reference source $V_{TH4}$ being close to but slightly more positive than the zener voltage. Thus, the curve 34 is shifted upwardly with respect to the curve 29 and when the threshold $TH_4$ is exceeded in the positive direction, at time $t_{16}$, the outlet valve is closed, this valve having been opened at time $t_{15}$ when the voltage output 34 first fell below the threshold $TH_4$. It will be appreciated then that opening and subsequent closing of the outlet valve is related to wheel rotational speed and is essentially independent of the deceleration and acceleration characteristics thereof.

Similarly, the closing of the inlet valve is related to wheel speed and occurs when voltage 29 falls below threshold $TH_6$ produced by source $V_{TH6}$ connected to amplifier $A_6$. However, its subsequent opening is related to wheel rotational acceleration as determined by the threshold $TH_5$ opening occurring at time $t_{17}$. Since the output of the amplifier $A_5$ connected to the differentiating filter 24, 27 is applied through the inverter 36 to the AND-gate 30, the inlet valve closes a second time during the cycle, at time $t_{18}$, when the output voltage 35 of the filter 24, 27 falls below the positive threshold $TH_5$ produced by source $V_{TH5}$. Subsequent opening of the inlet valve is controlled at time $t_{19}$ by the relation between output voltage 29 of filter 23, 26 and threshold $TH_6$.

The embodiment of FIG. 5 employs, in addition to the above, the diodes 31 and 32 associated with the filters 23, 26 and 25, 28. The effect of these diodes is to limit the voltage outputs 29 and 34 to slightly positive values as indicated at $g$ and $h$ in FIG. 6. As a result, each cycle becomes independent of any other and the inlet valve opens for the last time during each cycle exactly when the speed of the wheel differs from the speed of the vehicle by a predetermined amount, i.e., it is not dependent upon wheel acceleration as in the embodiment of Figure 2.

The embodiment of Figure 5, however, may lead to a condition in which the increase in brake fluid pressure occurring between the times $t_{17}$ and $t_{18}$ is too high so that the wheel does not accelerate rapidly enough and, consequently, the threshold value $TH_6$ is not reached by the curve 29 at time $t_{19}$. If, under these circumstances, a sudden increase in frictional characteristics between the wheel and roadway occurs, there is danger of the wheel locking up.

Figure 7:
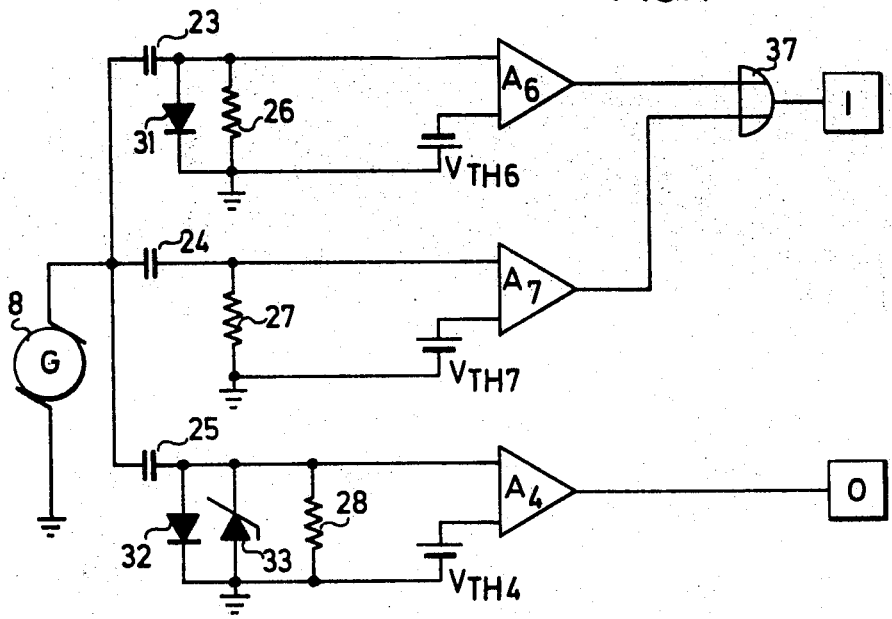
FIG. 7 is a circuit diagram of a still further modified form of the invention.

To overcome this drawback, an embodiment according to Figure 7 may be utilized. The embodiment of Figure 7 differs from that of Figure 5 in that a differential amplifier $A_7$ having a lower threshold bias $V_{TH7}$ is substituted for the differential amplifier $A_5$ in Figure 5, the inverter 36 of Figure 5 is eliminated and an OR-gate 37 is substituted for the AND-gate 30 of Figure 5. The control of the outlet valve is identical with that described in conjunction with Figure 5 and shown in Figure 6. However, by using the OR-gate 37 and the lower threshold value $TH_7$ as shown in Figure 6, the inlet valve will close at time $t_{14}$ and will remain closed until either $t_{19}$, when voltage 29 exceeds threshold $TH_6$, or $t_{19}'$, when voltage 35 falls below $TH_7$, whichever occurs later.

Figure 8:
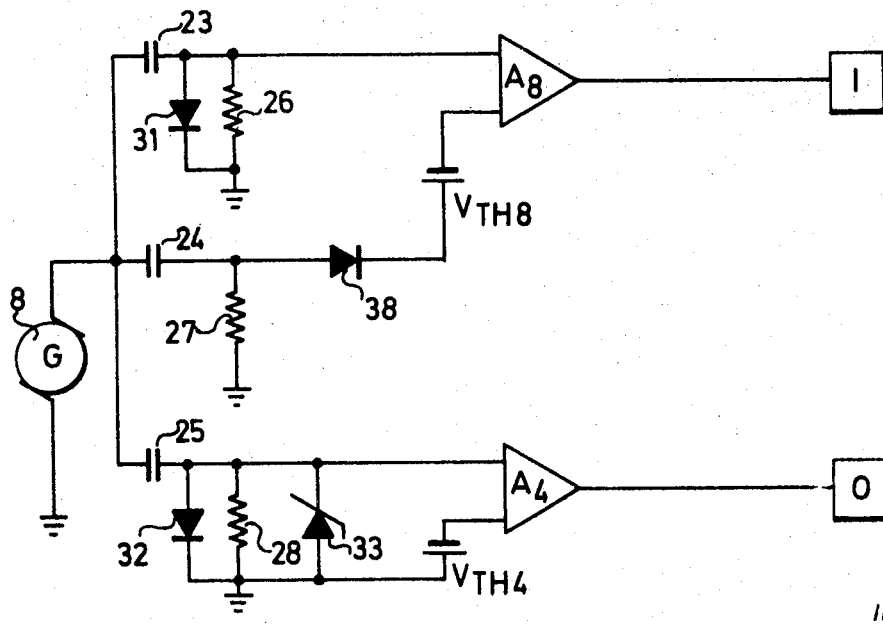
FIG. 8 shows a further modification of the invention.
Figure 9:
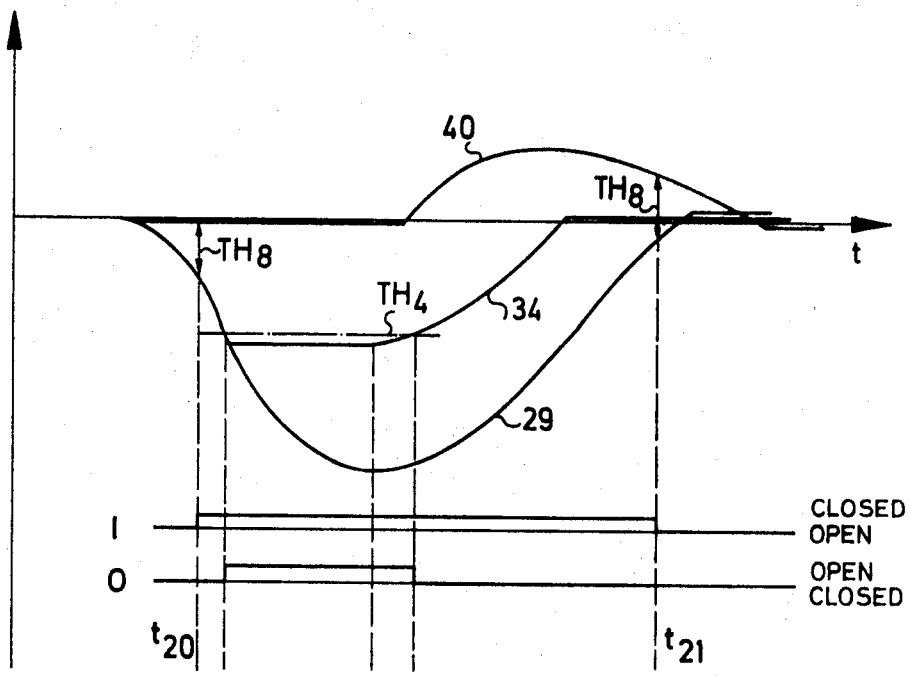
FIG. 9 is a composite diagram illustrating the operation of the embodiment of FIG. 8.

In the embodiment according to Figure 8, a single threshold circuit is employed for the inlet valve in the form of the differential amplifier $A_8$. The filter 23, 26 with its diode 31 in the upper branch of the circuit is identical with the corresponding unit of Figure 7 whereas the filter 24, 27 in the center branch differs from that of Figure 7 by the addition of the diode 38 which is connected in the filter output line and which limits the filter output voltage in the negative direction. The switching threshold $TH_8$ is not selected with reference to zero potential as in previous embodiments but, instead, the voltage source $V_{TH8}$ which determines the threshold value $TH_8$ is connected between the amplifier $A_{85}$ and the output voltage of the filter 24, 27. In this way, the difference between the output voltages of the two filters is compared with the threshold values $TH_8$ so that the inlet valve is closed as long as the difference is higher than the threshold value. Thus, with reference to Figure 9, the inlet valve will close at time $t_{20}$ and will reopen at time $t_{21}$, the inlet valve remaining closed during the time interval between $t_{20}$ and $t_{21}$ when the difference between the curves 29 and 40 exceeds the threshold $TH_8$.

It will be understood that the above description of the present invention is susceptible to various modifications, changes and adaptations.

We claim:

1. In an antilocking control system for vehicle brakes of the type having a main pressure line, inlet valve means in said line for selectively admitting brake fluid under pressure from a source thereof, and outlet valve means for selectively reducing the working pressure of the brake fluid, the improvement comprising, in combination:

means for producing a speed-responsive signal whose voltage is proportional to the rotational speed of the wheel being braked;

first filter means having its input connected to the output of said means for producing a speed-responsive signal for producing a first output signal substantially in phase with said speed-responsive signal and being an approximation of the instantaneous difference between the peripheral speed of the wheel and the speed of the vehicle;

second filter means having its input connected to the output of said means for producing a speed-responsive signal for producing a second output signal which is substantially the first derivative with respect to time of said speed-responsive signal;

a plurality of threshold means with constant threshold levels;

means for feeding each of said first and second output signals to at least one of said threshold means; and control means connected to respond to the output signals from said plurality of threshold means for controlling the inlet and outlet valve means.

2. An arrangement as defined in claim 1 including a third filter means connected to the output of said means for producing a speed-responsive signal for producing a third output signal which is phase shifted with respect to said speed-responsive signal by an angle lying between the phase angles of said first and second output signals, means for feeding said third output signal to one of said plurality of threshold means, said control means being responsive to at least one threshold level of each said first, second and third output signals for controlling the inlet and outlet valve means.

3. An arrangement as defined in claim 1 wherein each of said first and second filter means comprises an RC series circuit and wherein a diode is connected across the resistors of at least some of said filter circuits.

4. An arrangement as defined in claim 1 wherein said first and second filter means comprise RC series filter circuits; wherein a third filter means having its input connected to the output of said means for producing a speed-responsive signal is provided, said third filter means comprising an RC series filter circuit and producing a third output signal which is substantially in phase with said speed-responsive signal wherein said plurality of threshold means includes first, second, and third threshold devices connected to the outputs of said first, second and third filter means respectively; and wherein said control means is responsive to the outputs of said first and second threshold devices for controlling said inlet valve means and is responsive to the output of said third threshold device for controlling the outlet valve means.

5. An arrangement as defined in claim 1 wherein: a diode coupling the outputs of said first and second filters together is provided; said means for feeding each of said first and second output signals feeds said coupled output signals to the input of each of said plurality of threshold means; and said control means is responsive to the output of each of said threshold means for controlling the inlet valve means and is responsive to the output of one of said threshold means, which comprises a hysteresis threshold amplifier, for controlling said outlet valve means.

6. In an antilocking control system for vehicle brakes of the type having a main pressure line, inlet valve means in said line for selectively admitting brake fluid under pressure from a source thereof, and outlet valve means for selectively reducing the working pressure of the brake fluid, the improvement comprising, in combination:
means for producing a speed-responsive signal whose voltage is proportional to the rotational speed of the wheel being braked;
filter means connected to receive such speed-responsive signal as its input, said filter means including first, second and third RC series filter circuits for respectively producing a first output signal substantially in phase with said speed-responsive signal, a second output signal which is substantially the first derivative with respect to time of said speed-responsive signal, and a third output signal which is substantially in phase with said speed-responsive signal; and control means connected to respond to said output signals for controlling the inlet and outlet valve means, said control means including a threshold means connected to the outputs of said first and second RC series filter circuits to receive said first and second output signals as respective inputs for controlling the inlet valve means, and a further threshold means connected to the output of said third filter circuit for controlling the outlet valve means.

7. An arrangement as defined in claim 6 further comprising a diode connected in parallel with each resistor of said first and third filter circuits.

8. An arrangement as defined in claim 7 further comprising a zener diode connected in parallel with the resistor of said third filter circuit.

9. In an antilocking control system for vehicle brakes of the type having a main pressure line, inlet valve means in said line for selectively admitting brake fluid under pressure from a source thereof and outlet valve means for selectively reducing the working pressure of the brake fluid, the improvement comprising, in combination:
means for producing a signal whose voltage is proportional to the rotational speed of a wheel being braked;
a plurality of RC series filter circuits connected to said means and responsive to variations in the signal thereof to produce a plurality of different output signals, a first of said filter circuits producing an output signal which is an approximation of the instantaneous difference between the peripheral speed of the wheel and the speed of the vehicle, said first of said filter circuits having a diode connected in parallel with the resistor thereof and diode means connected in parallel with the resistor of said first filter circuit in opposite polarity with respect to said diode connected in parallel with said resistor, said diode means having a higher breakdown voltage than said diode;
first and second actuator means connectable to such inlet and outlet valve means respectively; and
means connected to respond to different threshold levels of said output signals of said filter circuits and connected for controlling said first and second actuator means with the output signal of said first filter means being used to control said outlet valve means.

10. An arrangement as defined in claim 9 wherein a second one of said filter circuits is provided for the inlet valve means and produces an output which is an approximation of the instantaneous difference between the peripheral speed of the wheel and the speed of the vehicle, said arrangement further comprising, a diode connected in parallel with the resistor of said second filter circuit to limit the positive excursion of such output, and a threshold value circuit connected to said output of said second filter circuit and having a negative threshold.

11. An arrangement as defined in claim 10 wherein a third of said filter circuits is provided for the inlet valve means, said third filter circuit having an output substantially proportional to the rotational deceleration and acceleration of the wheel, said arrangement further comprising a third threshold valve circuit connected to the output of said third filter circuit and having a positive threshold and an OR gate connected to the outputs of said second and third filter circuits for controlling the inlet valve means.

12. An arrangement as defined in claim 9 wherein a second and a third of said filter circuits are provided for said inlet valve means, said second filter circuit having an output substantially proportional to the deceleration and acceleration of the vehicle wheel, and said third of said filter circuits producing an output which is an approximation of the instantaneous difference between the peripheral speed of the wheel and the speed of the vehicle, said third filter circuit having a diode connected in parallel with the resistor thereof to limit the positive excursion of the output signal thereof; said arrangement further comprising means for producing a control output signal for the inlet valve means as long as the difference between the outputs of said first and second filter circuits exceeds a predetermined threshold value.

* * * * *